(12) United States Patent
Zogg et al.

(10) Patent No.: US 7,342,938 B1
(45) Date of Patent: Mar. 11, 2008

(54) SPECTRALLY EFFICIENT APPROACH TO PROTECTION OF KEY ELEMENTS IN A NON-HOMOGENOUS DATA STREAM

(75) Inventors: Scott J. F. Zogg, Cedar Rapids, IA (US); Stephen M. Clark, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 891 days.

(21) Appl. No.: 09/923,081

(22) Filed: Aug. 6, 2001

(51) Int. Cl.
*H04J 3/16* (2006.01)
(52) U.S. Cl. .................. 370/465; 714/746; 714/774
(58) Field of Classification Search ............... 370/352; 714/752
See application file for complete search history.

(56) References Cited

U.S. PATENT DOCUMENTS

| | | | |
|---|---|---|---|
| 5,671,156 A * | 9/1997 | Weerackody et al. | 714/52 |
| 5,729,526 A * | 3/1998 | Yoshida | 370/206 |
| 6,044,073 A * | 3/2000 | Seshadri et al. | 370/342 |
| 6,292,917 B1 * | 9/2001 | Sinha et al. | 714/752 |
| 6,405,338 B1 * | 6/2002 | Sinha et al. | 714/752 |
| 6,658,019 B1 * | 12/2003 | Chen et al. | 370/465 |
| 6,757,860 B2 * | 6/2004 | Choi et al. | 714/757 |
| 7,159,164 B1 * | 1/2007 | Saifuddin et al. | 714/755 |
| 7,190,732 B2 * | 3/2007 | Chung et al. | 375/261 |
| 2003/0081592 A1 * | 5/2003 | Krishnarajah et al. | 370/352 |

* cited by examiner

*Primary Examiner*—Wing Chan
*Assistant Examiner*—Michael J. Moore
(74) *Attorney, Agent, or Firm*—Nathan O. Jensen; Kyle Eppele (57) ABSTRACT

A system and method for transmitting a file stream using quality of service capable links. The system has a network capable of supporting quality of service negotiations and an embedded component capable of negotiating different quality of service levels for a plurality of file streams according to importance of bits to be transmitted. To transmit the compressed data, the embedded component identifies important bits and less important bits in the file stream, negotiates quality of service parameters for a plurality of file streams, divides the important bits and less important bits into different file streams having different quality of service levels, and transmits the streams. On the receiving end, the received streams are synchronized and combined into a single stream for the application to display. The error correction and detection coding is performed by physical layers of the network, not the application or embedded component, thereby improving efficiency.

18 Claims, 3 Drawing Sheets

SPECTRALLY EFFICIENT APPROACH TO PROTECTION OF KEY ELEMENTS IN A NON-HOMOGENOUS DATA STREAM

BACKGROUND OF THE INVENTION

The present invention relates to a system and method for improved efficiency of data transmissions using multiple file streams. More specifically, the present invention relates to classifying bits of non-homogenous data into different streams according to the importance of the data, negotiating different quality of service guarantees for each stream according to the desired Bit Error Rate (BER), and transmitting the data using the multiple streams.

Many applications require reliable transmission of information. With general audio communications, noise or other distortion in the transmission results in a garble or distorted sound at the receiving end, but the data may still be intelligible. However, transmission of multimedia files such as audio-video transmissions, real-time transmissions of data and/or complex images require extremely reliable and timely delivery of data. Transmission errors may result in blurred images or unintelligible data.

Some applications require a reliable transfer of user bits across the network. Since transmission errors are unavoidable, such applications necessitate the correction of errors. Errors are due to missing packets or packets corrupted by transmission errors.

The transmission of bits is never perfectly reliable, and random errors occur even with the most carefully designed transmission link. The physical layer provides an unreliable bit transmission facility commonly called an unreliable bit pipe. The network nodes follow special procedures to transmit packets reliably over unreliable bit pipes. Procedures specify how the nodes can detect transmission errors and correct them by retransmission.

The current Internet standard relies on Internet Protocol (IP) forwarding, which uses a "best effort" standard for data transmission. Generally, the network attempts to deliver all traffic as soon as possible within the limits of its capacity, but without any guarantees relating to throughput, delay variation and packet loss. The IP layer communicates with packets called datagrams. Typically, datagrams have headers of 20-60 bytes and data payloads of up to 65K bytes. The IP protocol and the architecture of the Internet are based on the idea that datagrams, with source and destination addresses, can traverse a network of IP routers independently, that is, without the help of the sender or receiver.

Depending on network traffic, datagrams may travel completely different paths as routers along the way dynamically choose paths for the same IP to avoid loading down any one link. Thus, datagrams may be lost or may arrive out of order. The IP protocol can fragment datagrams (in routers) and reassemble them at the receiver. Generally, IP routers can discard IP datagrams en route without notice to the end users. IP relies on upper-level transport layers (such as TCP) to monitor datagrams and retransmit them as necessary.

Reliability mechanisms such as TCP assure data delivery, but do not ensure timely delivery or throughput. Thus, the IP layer uses a "best effort" service, which makes no guarantees about when data arrives or how much data it can deliver.

For traditional wired networks and for typical programs such as Internet browsers, email programs, file transfer protocols and the like, the IP limitation is acceptable because most applications running over the IP layer are low priority and low bandwidth data transmissions with high delay tolerance and delay variation. Furthermore, through retransmission, packet loss and bit errors can be reduced to insignificant levels.

As previously indicated, routers can discard datagrams without notice to the sender or receiver. In typical wired local area networks (LAN) and wide area networks (WAN) environments, such packet loss is accounted for using retransmission or other error coding. Other factors also contribute to the efficiency of data communications. For instance, noise introduces a fundamental limit on the rate at which communication channels can transmit bits reliably. Attenuation distortion may also occur due to deterioration of the strength of a signal as it propagates over a transmission line.

The bit error rate (BER) provides a measure of circuit or transmission quality. The BER is derived by dividing the number of bits received in error by the total number of bits transmitted during a predefined period of time. The BER provides an indication of end-to-end channel performance. The BER generally defines the capacity of a channel. If, for example, the channel capacity is equal to 30 Kilobytes per second (Kps), then it is possible to design a transmitter and receiver that transmits 29,999 bits per second (bps) over the channel with an error rate smaller than $10^{-9}$, i.e. with fewer than one bit out of 10 billion being incorrectly received. Such a channel cannot transmit reliably faster than 30,000 bps.

A good transmission link makes few errors. For instance the bit error rate of a typical optical fiber link is $10^{-12}$. Such a link corrupts one bit out of 10 trillion bits on average. Generally, if the transmission rate of the link is 155 megabits per second (Mps), then one incorrect bit arrives every $10^{-12} \div (155 \times 10^6)$ seconds.

Copper lines (wire pairs and coaxial cables) have larger bit error rates. A bit error rate of $10^{-7}$ is typical. A transmission link that sends packets of N bits each with a bit layer error rate equal to BER corrupts some fraction of the packets. That fraction is the packet error rate PER of the link. The packet error rate PER is the probability that N bits of one packet are not all received correctly and is equal $PER=1-(1-BER)^n$.

Whereas the BER of a coaxial cable or optical fiber link can be made very small, the situation is very different in wireless links. In wireless communication links, the BER can fluctuate widely over time (from between $10^{-1}$ to $10^{-5}$). The wireless receiver may find itself in a region where the power of the received signal is to low to recover the bits successfully. Physical obstructions, weather patterns, signal interference, attenuation, and numerous other factors contribute to the BER of a wireless transmission.

To account for data transmission errors, networks use two types of error control mechanisms: error correction and error detection with retransmission. When using error correction, the packets contain enough redundant information called an error correction code for the receiver to be able to correct the packets and to reconstruct the missing packets. CD players use such error correction codes to correct errors caused by dust or scratches on the compact disc.

When error detection is used each packet contains additional bits called error detection code that enables the receiver to detect that transmission errors corrupted the packet. When the receiver gets an incorrect packet, it arranges for the sender to send another copy of the same packet. The sender and receiver follows specific rules called retransmission protocols which supervise these transmissions.

For specific applications, such as multimedia, stored video, and other error-sensitive transmissions, various encoding techniques coupled with error correction alternatives have been employed. Typically, data to be transmitted are first gathered into a block of characters. An algorithm is applied to the block to generate one or more checksum characters that are appended to the block for transmission. The receiving device performs the same algorithms on the block it receives. The locally generated checksum is compared to the transmitted checksum. If the locally generated and transmitted checksums are equal, the data is assumed to have been received error free. Otherwise, the data block is assumed to have one or more bit errors and the receiving device then request the transmitting device to retransmit the data block.

Most compression algorithms are data content independent. Specifically, the compression algorithm or the data compression is actually performed at the data link level, rather than the presentation or application level. The problem associated with the data independent compression methods is that it is desirable to unambiguously identify various data types. Various data types may be interspersed or partially compressed, making data type recognition difficult. Another problem is that given a known data type, or mix of data types within a specific set or subset of input data, it may be difficult to predict which data encoding technique yields the highest compression ratios.

In real-time multimedia transmissions, retransmission introduces unwanted latency into the data transmission. Additionally, redundancy wastes precious bandwidth and requires more processing on both ends of the transmission. While increasing bandwidth to a level that eliminates packet delays is possible, such bandwidth increases do not account for temporary overloads and congestion cannot be avoided no matter how much bandwidth is available.

Modern communication systems are increasingly required to provide Quality of Service (QoS) negotiation capabilities. QoS means providing consistent and predictable data delivery. QoS is a continuum, defined by the network performance characteristics that are most important to users and their particular service level agreements. QoS mechanisms must work with wireline networking considerations (i.e. different line qualities, bandwidth considerations, traffic volume, and the like) as well as considerations particular to the wireless environment (i.e. signal degradation, shadowing, signal cancellation, and the like). The inherent BER of wireless transmissions require that error detection and correction be performed efficiently, even when efficient bandwidth allocation is difficult.

Generally, certain bits within any data stream are more important than others. With respect to image or video data, there is typically unused white space or lines within the frames which are identical or so similar that loss of such data in a lossy compression algorithm would be unnoticeable at the receiving end. Conversely, loss of the important bits within the data stream would result in a fuzzy image, garbled sound, or an unreadable file at the receiving end.

Compression is possible because the source output contains redundant or barely perceptible information. Redundant information is data that does not add information, such as white lines between lines of text on a page, periods of silence in a telephone signal, white space or identically shaded pixels in a picture, and similar lines in frames in video sequence. Redundancy can be reduced by algorithms that then achieve a near lossless compression, even though they reduce the number of bits in the source output. Barely perceptible information is, as the name indicates, information that does not affect the way we perceive the source output. Examples of barely perceptible information in audio communications include sounds at frequencies that the human ear does not hear or sounds that are masked by even louder sounds. In images, some fine details are difficult to perceive and can be eliminated without much picture degradation. Such barely perceptible information is reduced or eliminated by lossy compression algorithms.

The transmission of information from one computer to another typically uses one compression algorithm for the entire transmission, such that lossy compression algorithms will impact important bits as well as the less important bits. Thus, processing power is wasted in error checking unimportant bits.

Many data streams, such as compressed video and voice, contain elements with different requirements with respect to bit error rate. In compressed video, corruption of some elements will disrupt the entire picture, while corruption of other elements will disrupt only a small portion of the frame.

State of the art compression techniques account for this difference by applying an error correction code at the application level to provide greater protection for the more valuable elements of the data stream. This technique, however, is inherently inefficient use of bandwidth because error correction applied at the application level is of necessity a hard decision code. The application layer cannot take advantage of the soft decision capability available only to the lower layers of the communication stack. Soft decisions are known to provide 2 dB to 5 dB improvement in signal quality and jamming immunity.

BRIEF SUMMARY OF THE INVENTION

The present invention employs an embedded function which identifies important bits and less important bits within a particular file or object to be transmitted. The embedded code negotiates multiple streams with different Quality of Service level for each stream. The embedded code then separates the important bits from the less important bits within the file to be transmitted and places the important bits in the high QoS stream and the less important bits in the lower QoS stream. The application thereby allows the physical layers to handle the error correction and encoding and to transmit the file in multiple streams via any transmission protocol that supports QoS channels. The multiple streams are decoded by the physical layer and reassembled by an embedded function on the receiving end, allowing both lossless and lossy compression techniques to be employed on the same file concurrently. Thus, it is possible to transmit video/audio or combined video/audio files at a high efficiency with few bit errors.

DETAILED DESCRIPTION

Figure 1:
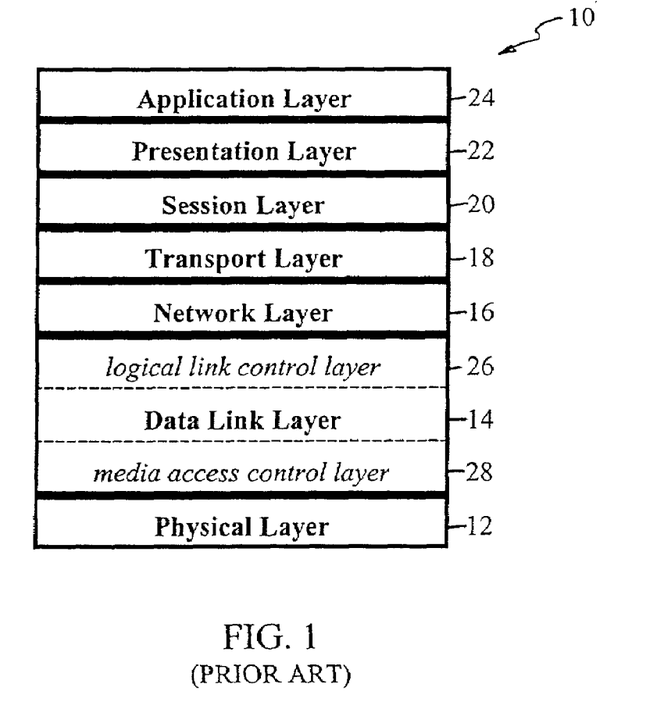
FIG. 1 is a diagram of seven layer model.

FIG. 1 illustrates a hierarchical model 10 of the communications process of a typical computer. The International Standards Organization (ISO) established a framework for standardizing communication systems called the open system interconnection (OSI) reference model 10. The OSI architecture identifies the communications process as a set of seven layers consisting of a physical layer 12, a data layer 14, a network layer 16, a transport layer 18, a session layer 20, a presentation layer 22, and an application layer 24. Each layer 12,14,16,18,20,22,24 consists of a set of functions which relate a specific set of functions. For example, the functions associated with the physical connection of equipment to a network are referred to as the physical layer 12. Each layer serves lower layer processes, effectively isolating low level processes from higher layer functions. In this way, each layer 12 performs a set of functions necessary to provide a set of services to the layer above it.

Layer isolation permits the characteristics of a given layer 12,14,16,18,20,22,24 to be changed without impact on the remainder of the model 10, provided that the supporting services remain the same. The layer model 10 allows users to mix and match OSI conforming communication products to customize their communication systems to satisfy particular networking requirements and/or needs.

At the lowest or most basic level, the physical layer 12 is a set of rules that specifies the electrical and physical connection between devices. This level specifies the cable connections and the electrical rules necessary to transfer data between devices. The physical layer 12 can be considered to be bounded below by the interconnecting medium over which the transmissions flow.

The data link layer 14 specifies how a device gains access to the medium specified in the physical layer 12. The data link layer 14 also defines data formats to include the framing of data within transmitted messages, error control procedures and other link controlled activities. Generally, the data link layer 14 is responsible for the reliable delivery of information. Data link controlled protocols, such as binary synchronous communications and high level data link control, reside in this layer. The data link layer 14 frames the data into a specific format at the sending node and extracts the data at the receiving node. The data link layer 14 also supervises the resulting packet delivery. By framing the data, the data link layer 14 at the receiving node is able to locate the data packets in the bit stream. Under the IEEE802 standard, the data link layer 14 was originally divided into two sublayers: the logical link control layer 26 and the media access control layer 28. The logical link control layer 26 is responsible for generating and interpreting commands that control the flow of data and performing recovery operations in the event of errors. By comparison, the media access control layer 28 is responsible for providing access to the local area network (LAN), which enables a station on the network to transmit information.

The network layer 16 is responsible for arranging a logical connection between a source and a destination on the network, including the selection and management of a route for the flow of information between the source and the destination, based on the available data paths in the network. Services provided by the network layer 16 are associated with the movement of data through a network, including addressing, routing, switching, sequencing and flow control procedures. In a complex network, the source and destination may not be directly connected by a single path, but instead may require a path to be established that consists of many subpaths.

The transport layer 18 is generally responsible for guaranteeing that the transfer of information occurs correctly after a route has been established through the network by the network layer 16. Thus, the primary function of the transport layer 18 is to control the communication sessions between network nodes once a path has been established by the network control layer 16. Error control, sequence checking, and other end-to-end data reliability factors are the primary concern for the transport layer 18, and they enable the transport layer 18 to provide reliable end-to-end to data transfer capabilities.

The session layer 20 provides a set of rules for establishing and terminating data stream nodes in the network. The services that the session layer 20 provides include establishing and terminating node connections, message flow control, dialog control and end-to-end data control.

The presentation layer 22 is concerned with data transformation, formatting and syntax. One of the primary functions performed by the presentation layer 22 is the conversion of transmitted data into a display format appropriate for a receiving device (such as a monitor), including any necessary conversion between the different data codes. Conversions handled by the presentation layer 22 include data encryption, decryption, data compression and decompression.

Generally, the application layer 24 acts as a window through which the application gains access to all of the services provided by the OSI model 10. Functions performed at the application layer 24 include file transfers, resource sharing, data base access and the like. The services hosted by the session layer 20, the presentation layer 22, and the application layer 24 may vary considerably, depending on the network used.

Even though there are seven distinct layers, these layers do blend together. The OSI model is simply a representation of the structure of a computer's communication process. Each layer typically communicates with three other layers: the layer below it, the layer above it, and its peer layer on the remote computer with which it is communicating. Even though an OSI model layer functions as though it were communicating directly with its peer layer on the other machine, all communications move down through the layers on the sending machine and up through the layers on the receiving machine. Thus, this peer-to-peer communication is only virtual communication.

To accomplish this virtual communication between layers of different machines, each layer of the sending computer adds a header (a section of an electronic message, ordinarily at the beginning of the message, that routes it to its destination and often identifies the sender). Only the same layer, or its counterpart on the receiving machine can recognize and use this header. As the message moves up the layers on the receiving computer, these headers are removed one at a time by the corresponding layers. By the time the message reaches the appropriate receiving layer, the receiving computer has stripped off all the headers and the data is in the same format as it was on the sending machine at the same layer.

When a user clicks on a hypertext link on a web page that resides on a remote computer, the application layer 24 on the user's computer detects that the user has requested a remote file. The application layer 24 then formulates a request to the remote computer for the requested hypertext file. Once the request is ready, the application layer 24 passes the request to the presentation layer.

The presentation layer 22 reviews the request to determine whether any encryption or data translation is required. If encryption and/or data translation is required, the presentation layer 22 executes the required process. Then, the presentation layer 22 adds any information that is required or needed by the presentation layer 22' of the remote computer and passes the packet to the sessions layer 20. The sessions layer 20 verifies the request packet and adds information to the packet to assist the remote server in handling the request. Then the sessions layer 20 passes the packet to the transport layer 18.

The transport layer 18 ensures that it has a reliable connection to the remote computer. Then, the transport layer 18 divides the data into one or more frames. Typically, if the transport layer 18 requires more than one frame, the layer 18 appends each frame with a sequence number. The transport layer 18 then passes the frames to the network layer 16.

The network layer 16 adds the address of requesting computer and the remote computer to each frame before passing each frame to the data link layer 14. The data link layer 14 computes a cyclic redundancy code (CRC) and adds the CRC to each frame. The CRC is an error detection code that most data communication networks use. For instance, in Ethernet networks, the CRC computes 32 bits from the bits in a packet and appends those 32 bits at the end of the packet. The receiving node verifies that it has the same value for the 32 bits at the end of the packet. If it does not have the same value, some transmission error corrupted the packet. The data link layer 14 then converts each frame into 0s and 1s and passes the bit stream to the physical layer 12, which places the bit stream onto the network. Depending on the network topology (physical configuration), this could mean waiting for a quiet moment on the network, waiting for a token, or waiting for a specific time before transmission.

When the remote computer or server receives the bit stream, the process is reversed and the request is processed. As a result of that processing, these same steps are used by the remote computer to transmit a copy of the requested hypertext page to the user's Internet browser. Once that bit stream reaches the user's computer, the process is reversed once again in order to feed the requested hypertext page into the user's Internet browser.

The OSI model 10 provides a conceptual framework for networking computers. However, the OSI model 10 is not a method of communications. By using communications protocols and connection devices, communication is possible. The seven layer model 10 provides rules or guidelines that control how computers exchange information over a network. In the real world, network protocols implement one or more layers of the OSI model 10. In human form, communications protocols represent the spoken language, say English or Spanish, while network protocols represent how the text is exchanged, say by book or audio stream and the like.

Many data streams, and particularly compressed data, are comprised of elements of differing value to the overall communication. To take advantage of the differing values and the QoS negotiation capabilities offered by modern network topologies, the present invention uses an embedded function or function within the user's application to negotiate multiple data streams at differing bit error rate (BER) levels of QoS. Latency, data throughput guarantees, and packet loss can also be negotiated, such that each stream has a QoS that is specific to the value of the bits in that stream.

Figure 2:
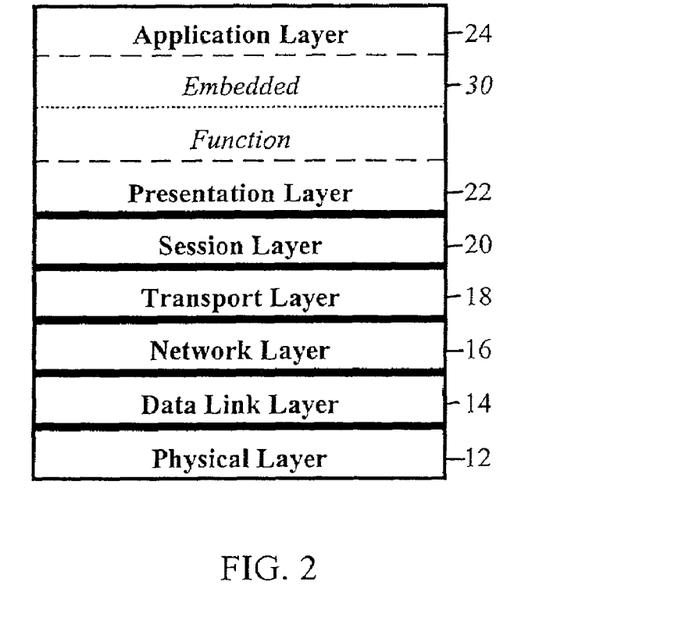
FIG. 2 is a diagram of the location of the embedded function within the seven layer model.

FIG. 2 illustrates the position of the embedded function or embedded function 30 of the present invention between the application layer 24 and the presentation layer 22 within the OSI model 10. The embedded function 30 is implemented in software code as a plugin, a software patch for existing legacy systems, an inline function within software code, a class or object, or any other software method or implementation. In the preferred embodiment, the embedded function is a function within a software application.

The embedded function 30 intercepts an application call initiating a file stream. The embedded function 30 identifies the important bits within the stream and the less important bits within the stream, and negotiates a QoS appropriate for each gradation or valuation of bits. The embedded function 30 assigns separate QoS parameters based on the error rate requirements of each gradation or valuation. In a large stream for example, three tiers of bits may be included in the application's stream. The embedded function 30 automatically recognizes that three tiers of bits are present, negotiates three file streams having different bit error rates, latency rates, and so on. In other words, the embedded function 30 negotiates three streams having different QoS levels.

In a file with 100 total bits where 99 bits are trivial and 1 bit is very important to the overall transmission for example, the embedded function 30 negotiates a $10^{-6}$ BER (1 error in 1,000,000 bits) for a first stream and a $10^{-1}$ BER (1 error in 10 bits) for a second stream. Then, the embedded function 30 places the one important bit in the first stream and the 99 less important bits in the second stream. The embedded function then passes the two streams down through the communication layers, which perform the necessary error coding to maintain the negotiated quality of service.

Within any given file stream, there are usually bits that are less valuable to the transmission than others, as opposed to bits that are very important to the transmission. In a text stream, the text characters are important; however, white lines between lines of text on a page are less important. Such white lines can easily be compressed and decompressed using lossy algorithms without degrading the signal. Similarly, silence, sounds at frequencies beyond human hearing, or masked sounds in audio transmissions, and white space, similarly shaded pixels or extremely fine details in video transmissions are all examples of less important bits. Periods of silence in audio transmissions or white space or identically shaded pixels in a video or image transmissions can be compressed using lossy algorithms without significant degradation of signal quality on the receiving end. Redundant information, such as similar pixels in an image can be reduced by algorithms that then achieve a near lossless compression, even though they reduce the number of bits in the source output. Barely perceptible, such as sounds beyond the range of human hearing and sounds that are masked by louder sounds can be transmitted using lossy algorithms without degrading the received signal noticeably. In images, some fine details are difficult to perceive and can be eliminated through lossy transmissions without much picture degradation. By contrast, important bits, if lost, would result in noticeable signal degradation at the receiving device.

By dividing the two streams and sending them simultaneously at two differently negotiated quality levels, the system can transmit the entire stream much more efficiently. The receiving and the sending computers spend more of their resources on the important bit and less on the more numerous less important bits. By using higher error correction for important bits and lower error correction for unimportant bits, the processor does not waste processing power with redundancy or retransmission of unimportant bits. In noisy transmission channels, the transmission rate is reduced and the number of bit errors requiring retransmission is minimized. Thus, the overall efficiency of the transmission is improved.

While the present invention has been discussed with respect to two or three separately negotiated QoS streams, there is a practical limit on the number of streams that may be separately negotiated. The QoS system may impose a limit on the number of possible variations of streams, due to the number of parameters that can be controlled or negotiated. For instance, if the QoS server allows the application to negotiated between two different settings for each of three parameters, there are only eight different QoS levels that can be negotiated. While QoS levels may be duplicated so as to subdivide a particularly large block of data, typical transmissions do not warrant such subdivision. Generally, there is a marginal return value for the number of streams employed. Each stream adds processing requirements on the sending and receiving computer. If the file is fairly small, the processing time required to divide and reassemble the streams at the two ends of the transmission may be greater than any latency introduced by the sending the entire file at the highest possible error correction or QoS. In typical transmissions, two streams suffice. However, in large file that may have three or more tiers of data, more than two streams is possible.

The embedded function may be built into the application itself or added into one of the layers above the transport layer in order to perform the QoS negotiation. No matter where the embedded function 30 is stored, the embedded function must be able to unambiguously identify important and less important bits within a transmission stream. In the preferred embodiment, the embedded function 30 is built into the application.

By negotiating a high QoS having a very low bit error rate, the lower layers of the OSI model 10 protect the most important bits so that the overall transmission is more error tolerant. Furthermore, since the data link layer 14 has full knowledge of the transmit waveform supported by the network, the data link layer 14 can apply advanced signal processing techniques to optimize the coding placed upon each stream based upon the requirements negotiated by the embedded function 30. Thus, the present invention is largely independent of the physical network over which the transmission is sent. By relying on the lower layers to perform the coding and decoding according to a negotiated QoS, the embedded function can function on any system that supports QoS negotiation.

At the peer application layer on the receiving device, an embedded function recombines the streams of data into a single stream for use by the relevant application.

Currently, all networks do not support QoS services. However, modern communication systems are increasingly required to support QoS negotiation between layers. QoS negotiations are expected to become common, particularly in the wireless environment. As the popularity of compressed audio and video transmissions increases, the QoS services are expanding into network services as well.

As previously indicated, compressed data streams nearly always have key elements or components that require greater error detection and correction, particularly in a wireless environment. Due to the numerous factors that impact wireless transmissions (such as physical obstructions, attenuation, and the like), controlling the bit error rates of the QoS negotiation and sending the bits according to their required QoS offers the potential of 3 dB or more improvement in the signal quality at the receiving end.

Figure 3:
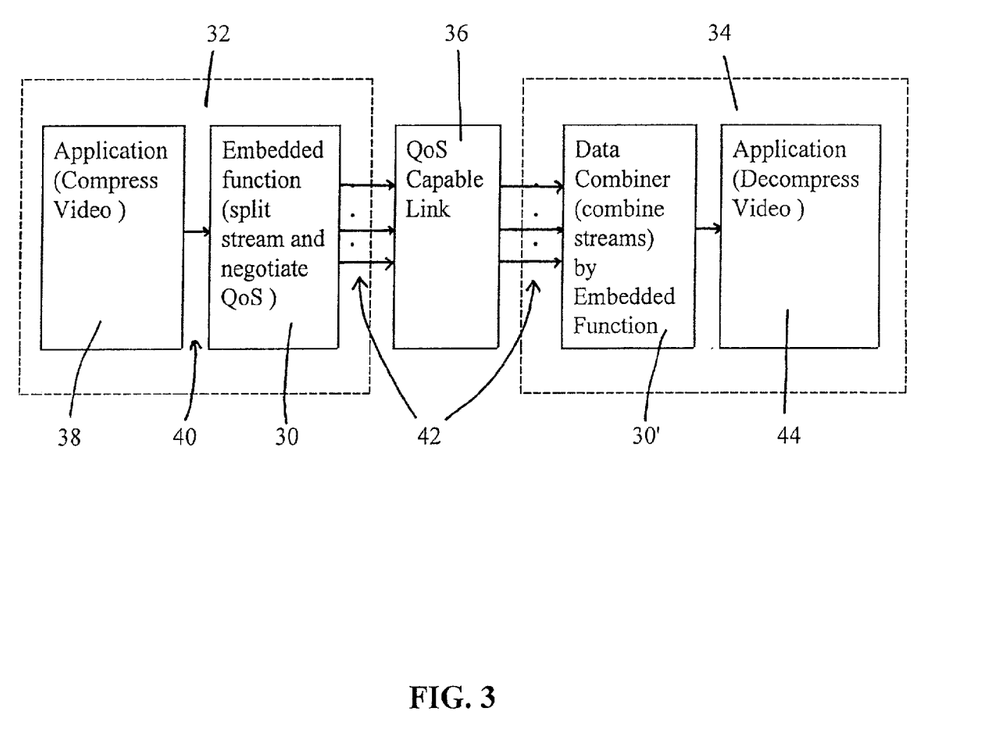
FIG. 3 is an overview of the system of the present invention.

FIG. 3 provides an overview of the entire transmission of the present invention. The sending device 32 is connected with a receiving device 34 via a QoS capable link 36. The application 38 begins transmitting a file stream 40 to an intended recipient. The embedded function 30 identifies important bits and less important bits, splits the file stream 40 into multiple streams 42 (one for each level of bit importance), and negotiates different QoS levels with the lower layers in the OSI for each stream. The streams 42 are passed down the communications stack and transmitted over the QoS capable link 36 (whether wired or wireless).

The receiving device 34 receives the transmitted streams 42 at the physical layer 12, and passes the transmitted streams up the communications stack to the embedded function 30' on the receiving device 34. The embedded functions 30 and 30' are identical. Both have the capability of dividing a stream 40 into streams 42 and of recombining streams 42 into stream 40. The embedded function 30' resynchronizes the streams and recombines the streams 42 into a single stream 40, which is handed to the application 44 on the receiving device 34. The application 44 then decompresses the transmission and displays the transmission to an end user.

In very noisy transmission environments, by dividing the bits, negotiating different levels of error correction, and then transmitting the bits in separate streams, the received signal strength improves as much as 2 dB to 5 dB. In partial band interference situations, i.e. when a segment of the frequency band experiences interference, the advantage gained by this method is even greater. At the physical layer 12, the system can identify which bits are hit by interference. An always on interference at a particular frequency can be corrected as much as 2 dB at the receiving end. Chaotic interference is the most common form of noise, and overall can be corrected by as much as 5 dB.

Generally, the physical layer on the receiving end weights symbols received on a clear channel with a strong weighting. Channels with interference are weighted low. Under certain signal to noise ratios, 2 dB to 5 dB improvements in received signal strength can be seen.

The bit error rate can be negotiated on some networks. Not all networks currently support multiple file streams at different Quality of Service (QOS) or error checking rates. Typically, wireless networks do support this. Generally, in the preferred embodiment, the network should allow negotiation of the bit error rate, latency, and so on. Bit error rate negotiation of Quality of Service characteristics allows the different streams to be treated differently by the physical layer. The less important bits receive less error checking, but these bits can experience greater numbers of errors without degrading the signal. The higher importance bits must be protected more so that the stream is more error tolerant.

We can view a compression algorithm as implementing a function that produces a new file with fewer bits. The decompression algorithm calculates or reconstructs the original signal. This reconstruction must be exact in a lossless compression and hopefully almost exact in a lossy compression.

The above formulation of the compression/decompression process ignores the timing of the operations. Consider the hypothetical compression/decompression of a video signal during a video conference. The video camera produces a bit stream at 20 megabytes per second. The compression algorithm converts the stream into a 1.5 megabit per second that the decompression converts back into a 20 megabits per second stream close to the original. More specifically, the video camera captures successive frames at the rate of 28 frames per second. These frames are converted into a bit stream which is compressed, then decompressed. The receiver uses the decompressed bit stream to reconstruct the frames that approximate the original ones. The delay between the capture of a frame and its reconstruction by the receiver is of critical importance in real time applications. By dividing the stream into two streams, one of important bits and the other of less important bits, and negotiating different QoS for each stream, the transmission delays are minimized so that real-time transmission is more accurate and efficient.

This delay is also important for stored video. When a user wants to view a stored video clip, it is desirable for the play back to start as soon as possible. The delay jitter in the network should be compensated for by a playback buffer. It is also clear that such a stream playback is possible only if the network can deliver a compressed bit stream without building up a back log.

In the case of fixed pictures, it is desirable to have a progressive reconstruction of the picture. That is in trying to view in image that is stored as a large file, it is desirable to view quickly a low resolution version of the image that improve progressively.

Finally, since network connection have widely different band width, it is desirable to be able to request different versions of audio or video clips or streams. These version correspond to different qualities of reconstruction, being compressed differently. Multilayer compression algorithms provide complimentary versions of clip, like adding layers of details to a course initial version to provide increasingly fine reproductions.

By separating the important bits from the unimportant bits and allowing the physical layers to handle the error checking and Quality of Service, the latency is minimized. The entire transmission is more efficient, and unnecessary error checking on unimportant bits is eliminated.

Figure 4:
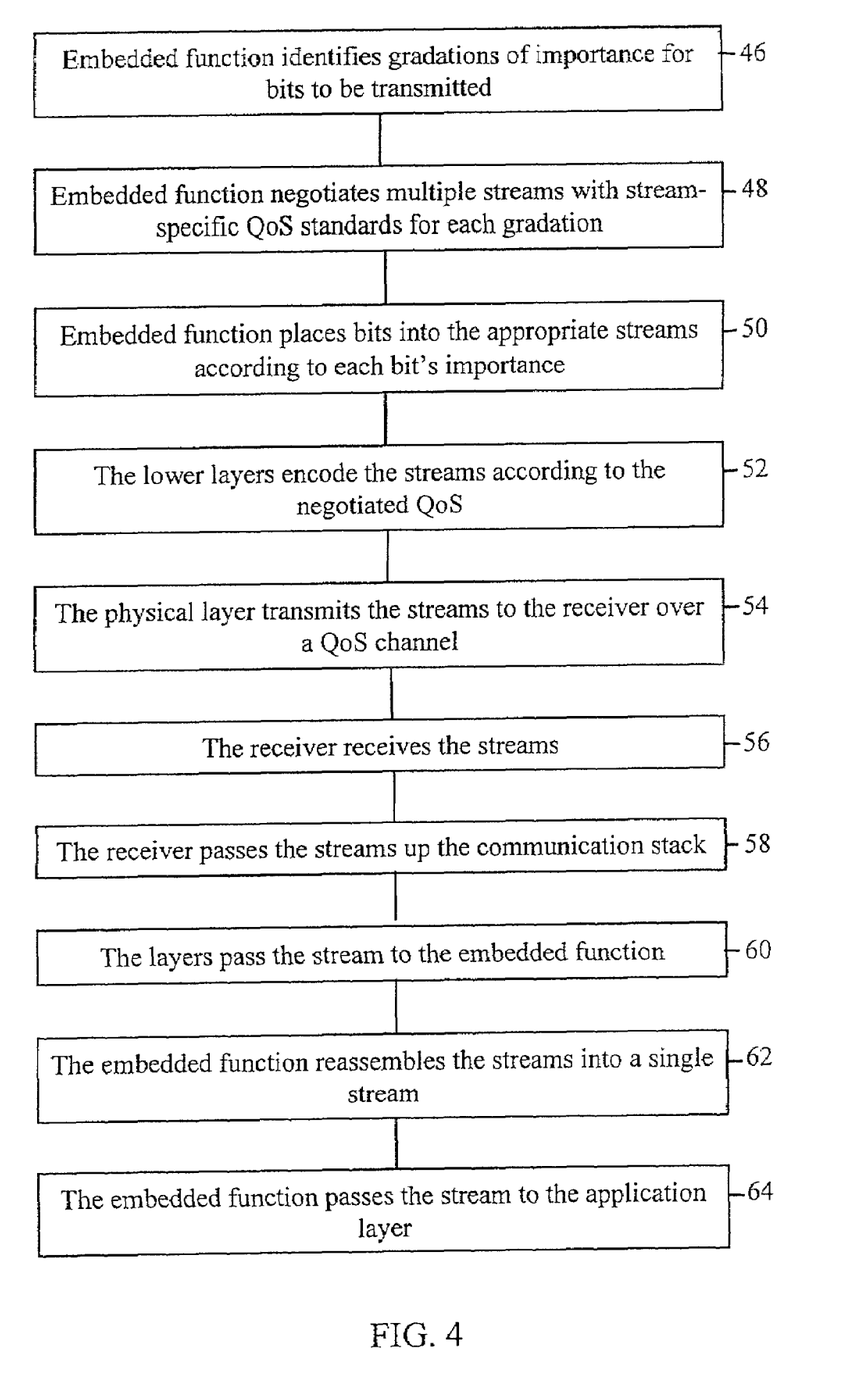
FIG. 4 is a flow diagram of the transmission process of the present invention.

FIG. 4 illustrates a method of implementing the present invention. The embedded function 30 identifies gradations of importance for bits within a stream to be transmitted (step 46). The embedded function 30 negotiates multiple streams with different QoS standards or levels for each stream 40 (step 48). The embedded function 30 places the important bits in the stream with the lowest bit error rate (i.e. the highest error correction rate, such as $10^{-6}$) and the less important bits in the stream with a higher bit error rate (i.e. low error correction rate, such as $10^{-1}$) (step 50). The lower layers encode the streams according to the negotiated QoS for each stream (step 52). The physical layer then transmits the streams to the receiver over a QoS capable channel (step 54).

The receiving device receives the streams (step 56) and passes the streams up the communication stack (step 58), decoding the streams at each layer. The layers pass the stream up to the embedded function (step 60), which synchronizes and reassembles the streams into a single stream (step 62). The embedded function then passes the stream to the application layer (step 64) for display to an end user.

In an alternative embodiment, the embedded function 30 may reside in the presentation layer 22 or session layer 20, and the application may identify important bits and less important bits by a coding technique within the stream, thereby assisting the function 30 in forming the multiple streams. In still another embodiment, the data splitting and QoS negotiation can be performed by a separately or later embedded component, rather than a function within the application. Specifically, existing or legacy applications may be modified by an plugin or software "patch" to provide the described functionality.

In a further alternative embodiment, the data splitting and QoS negotiation algorithms may performed by separate components or plugins. The application itself may assist the separate components by flagging or otherwise identifying certain bits as important so as to assist the components in unambiguously identifying the bits and appropriately negotiating the QoS levels for each stream.

Although the present invention has been described with reference to preferred embodiments, workers skilled in the art will recognize that changes may be made in form and detail without departing from the spirit and scope of the invention.

What is claimed is:

1. A method for transmitting a file stream using quality of service capable links, the method comprising:
   intercepting an application call initiating the file stream, wherein an embedded function located between an application layer and a transport layer is configured to initiate the intercepting the application call initiating the file stream;
   identifying important bits and less important bits within the file stream, the important bits being those of which corruption will disrupt an entire frame of the file stream;
   negotiating quality of service parameters for at least two streams wherein each stream is associated with a detected level of interference, wherein one of the two streams has a higher quality of service level based at least in part on the detected level of interference;
   placing the important bits in the one of the two streams having the higher quality of service level;
   placing the less important bits in a second of the at least two streams;
   transmitting the at least two streams; and
   wherein the embedded function is configured to identify important bits and less important bits within the file stream and to negotiate quality of service parameters for at least two streams.

2. The method of claim 1, wherein negotiating quality of service parameters comprises:
   negotiating different quality of service parameters for each file stream, the negotiated quality of service corresponding to an identified importance of bits within the file stream.

3. The method of claim 2, wherein the negotiated quality of service parameter is a bit error rate.

4. The method of claim 1, wherein the steps of placing important bits and placing less important bits do not include otherwise encoding the important bits.

5. The method of claim 4, wherein lower layers in a communications stack within a transmitting device perform error detection and correction encoding on the file streams according to the negotiated quality of service.

6. The method of claim 1, wherein transmitting the at least two streams comprises:
   transmitting the at least two streams over a quality of service capable transmission link.

7. The method of claim 6, wherein the at least two streams are transmitted simultaneously over the quality of service capable transmission link.

8. The method of claim 1, wherein a received signal quality is improved as much as 2 dB to 5 dB on noisy transmission channels without causing additional delays in the transmission.

9. A system for transmitting compressed data, the system comprising:
   a network configured to supporting quality of service negotiations;
   a link configured to supporting quality of service channels, wherein each service channel is associated with a detected level of interference; and
   a software component for negotiating quality of service parameters with the network, the software component being located above a transport layer of the network, the software component configured for identifying important bits within a file stream and separating the important bits that must be correctly received by a receiving device for a successful transmission and less important bits in two separate file streams having different quality of service parameters; and wherein the software component is configured to include an embedded function, the embedded function is configured to intercept an application call initiating a file stream.

10. The system of claim 9, wherein the network is a wireless network.

11. The system of claim 9, wherein the software component is a software plugin applied to existing compiled software.

12. A method for transmitting and receiving compressed data, the method comprising:

intercepting an application call initiating a file stream, wherein an embedded function located between an application layer and a transport layer is configured to initiate the intercepting the application call initiating the file stream;

identifying gradations of importance of bits within a file stream by
identifying bits that must be correctly received by a receiving device for a successful transmission; and
identifying bits to be discarded or transmitted via lossy compression techniques without detectable signal degradation;

negotiating quality of service parameters for each of a plurality of file streams, wherein each file stream is associated with a detected level of interference, the plurality of file streams equal to a number of gradations of importance;

associating bits within the file stream with the identified gradations of importance such that important bits and less important bits are identified;

separating important bits into a first of the plurality of file streams having a lower detected level of interference based on the negotiated quality of service;

separating less important bits into remaining file streams according to their respective gradations of importance;

transmitting the file streams to a receiving device;

synchronizing the file streams received by the receiving device;

combining the received file streams into a single stream; and passing the single stream to a device for viewing; and wherein the embedded function is configured to identify bits that must be correctly received by a receiving device for a successful transmission, to identify bits to be discarded or transmitted via lossy compression techniques without detectable signal degradation, and to negotiate quality of service parameters for each of a plurality of file streams.

13. The method of claim 12, wherein the identified bits that are to be discarded include sounds beyond the range of human hearing or sounds overwhelmed by other sounds for audio transmissions, white lines or extremely fine detail within an image, white lines between lines of text on a page, and identically shaded pixels within an image.

14. The method of claim 12, negotiating quality of service parameters comprises:
negotiating a bit error rate.

15. The method of claim 12, wherein negotiating quality of service parameters comprises:
negotiating a latency rate and a consistent throughput rate.

16. The method of claim 12, wherein separating important bits and separating less important bits does not include encoding the important bits or the less important bits; and
wherein lower layers of a communication stack on the network perform error detection and correction encoding according to the negotiated quality of service parameters.

17. The method of claim 12, wherein transmitting the file streams to a receiving device comprises:
passing the file streams down a communications stack on the network, wherein each layer of the communications stack adds error correction and detection coding consistent with the negotiated quality of service parameters; and
transmitting the streams over a quality of service capable link.

18. The method of claim 12, wherein synchronizing and combining the received file streams is performed by an embedded component on the receiving device.

* * * * *